US 9,372,953 B1

(12) United States Patent
Chandrakar et al.

(10) Patent No.: US 9,372,953 B1
(45) Date of Patent: Jun. 21, 2016

(54) INCREASING OPERATING FREQUENCY OF CIRCUIT DESIGNS USING DYNAMICALLY MODIFIED TIMING CONSTRAINTS

(71) Applicant: Xilinx, Inc., San Jose, CA (US)

(72) Inventors: Shant Chandrakar, Hyderabad (IN); Ilya K. Ganusov, San Jose, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 14/494,978

(22) Filed: Sep. 24, 2014

(51) Int. Cl.
*G06F 17/50* (2006.01)

(52) U.S. Cl.
CPC ........ *G06F 17/5077* (2013.01); *G06F 17/5031* (2013.01); *G06F 17/5072* (2013.01); *G06F 17/5081* (2013.01)

(58) Field of Classification Search
CPC ............ G06F 17/5081; G06F 17/5077; G06F 17/5072; G06F 17/5031
USPC ................. 716/113, 108, 122, 123, 130, 131; 703/16
See application file for complete search history.

(56) References Cited

U.S. PATENT DOCUMENTS

| | | | | |
|---|---|---|---|---|
| 5,648,913 A * | 7/1997 | Bennett | | G06F 17/5031 716/113 |
| 6,026,225 A * | 2/2000 | Iwasaki | | G06F 17/5068 716/112 |
| 7,051,312 B1 * | 5/2006 | Rahut | | G06F 17/5068 716/113 |
| 7,519,938 B1 * | 4/2009 | Shortt | | G06F 17/5045 716/104 |
| 7,979,732 B2 * | 7/2011 | Curley | | G06F 17/505 713/400 |
| 2002/0152059 A1 * | 10/2002 | Tanaka | | G06F 17/5036 703/15 |
| 2004/0003363 A1 * | 1/2004 | Odilavadze | | G06F 17/5068 716/55 |
| 2007/0018739 A1 * | 1/2007 | Gabara | | G06F 1/10 331/167 |
| 2007/0018740 A1 * | 1/2007 | Gabara | | G06F 1/10 331/167 |
| 2008/0201669 A1 * | 8/2008 | Weiner | | G01R 31/318547 716/132 |
| 2009/0070715 A1 * | 3/2009 | Curtin | | G06F 17/5031 716/132 |
| 2010/0037191 A1 * | 2/2010 | Kosuge | | G06F 17/5036 716/106 |
| 2010/0199248 A1 * | 8/2010 | Ito | | G06F 17/5072 716/122 |
| 2010/0275172 A1 * | 10/2010 | Yaguchi | | G06F 17/5031 716/123 |
| 2011/0041114 A1 * | 2/2011 | Komatsu | | G06F 17/5031 716/134 |
| 2011/0239178 A1 * | 9/2011 | Yamashita | | G06F 17/5077 716/122 |
| 2011/0276321 A1 * | 11/2011 | Tuan | | G06F 17/5054 703/14 |
| 2012/0013408 A1 * | 1/2012 | Cortadella | | G06F 17/505 331/34 |
| 2014/0195996 A1 * | 7/2014 | Bose | | G06F 17/5072 716/120 |

OTHER PUBLICATIONS

Altera Corporation, "9: Optimizing Qsys System Performance," Chapter 9, Quartus II Handbook, Ver. 13.1, vol. 1: Design and Synthesis, May 2013, pp. 1-44, San Jose, CA, USA.
Altera Corporation, "16: Netlist Optimizations and Physical Synthesis," Chapter 16, Quartus II Handbook, Ver. 13.1, vol. 2: Design Implementation and Optimization, Nov. 2013, pp. 1-16, San Jose, CA USA.
Synopsys, Inc. "DC Ultra, Concurrent Timing, Area, Power and Test Optimization," Datasheet, <http://www.synopsys.com/Tools/Implementation/RTLSynthesis/DCUltra/Documents/DCUltra-ds.pdf>, pp. 1-4, Mountain View, CA USA, Jan. 2014.

* cited by examiner

*Primary Examiner* — Phallaka Kik
(74) *Attorney, Agent, or Firm* — Kevin T. Cuenot (57) ABSTRACT

Processing a circuit design includes determining that an operating frequency for a first placement and routing for the circuit design does not exceed a target operating frequency, distinguishing between loop paths and feed-forward paths in the circuit design, and, responsive to determining that the operating frequency does not exceed the target operating frequency, relaxing timing constraints of the feed-forward paths using a processor. A second placement and routing is performed on the loop paths and the feed-forward paths of the circuit design.

20 Claims, 7 Drawing Sheets

INCREASING OPERATING FREQUENCY OF CIRCUIT DESIGNS USING DYNAMICALLY MODIFIED TIMING CONSTRAINTS

FIELD OF THE INVENTION

This disclosure relates to integrated circuits (ICs) and, more particularly, to increasing the operating frequency of circuit designs using dynamically modified timing constraints.

BACKGROUND

A circuit design is created with a target operating frequency in mind. The target operating frequency may be specified as a design constraint. During the design process, an estimate of the operating frequency of the circuit design may be determined and compared with the target operating frequency for the circuit design. In some cases, the estimated operating frequency of the circuit design may be increased by pipelining the circuit design. In other cases, however, pipelining may adversely affect the correctness of the circuit design.

SUMMARY

A method includes determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths using a processor. A second placement and routing is performed on the loop paths and the feed-forward paths of the circuit design.

A system includes a processor programmed to initiate executable operations. The executable operations include determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths. A second placement and routing is performed on the loop paths and the feed-forward paths of the circuit design.

A non-transitory computer-readable storage medium has instructions stored thereon which, when executed by a processor, perform a method. The method includes determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths. A second placement and routing is performed on the loop paths and the feed-forward paths of the circuit design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to increasing the operating frequency of circuit designs using dynamically modified timing constraints. In accordance with the inventive arrangements described herein, a circuit design may be processed to increase the achieved operating frequency of the circuit design. The circuit design may undergo one or more processes such as one or more placements and routings, incremental placements and routings, complete re-placements and re-routings, or the like in various combinations. In some cases, timing constraints of selected data paths may be relaxed during one or more of the placement and routing processes thereby giving those data paths without relaxed timing constraints higher priority during the placement and routing processes. The higher priority afforded to some data paths results in an optimized placement and routing for such data paths. In addition, pipeline stages may also be automatically inserted into the circuit design under appropriate circumstances during one or more of the placement and routing processes.

The inventive arrangements described herein may be implemented as a method or process performed by a data processing system. In another aspect, the inventive arrangements may be implemented as a data processing system having a processor. The processor, upon executing program code, performs and/or initiates the various circuit design-related operations described herein. In still another aspect, the inventive arrangements may be implemented as a non-transitory computer-readable storage medium storing program code that, when executed, causes a processor to perform the method(s) described herein.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
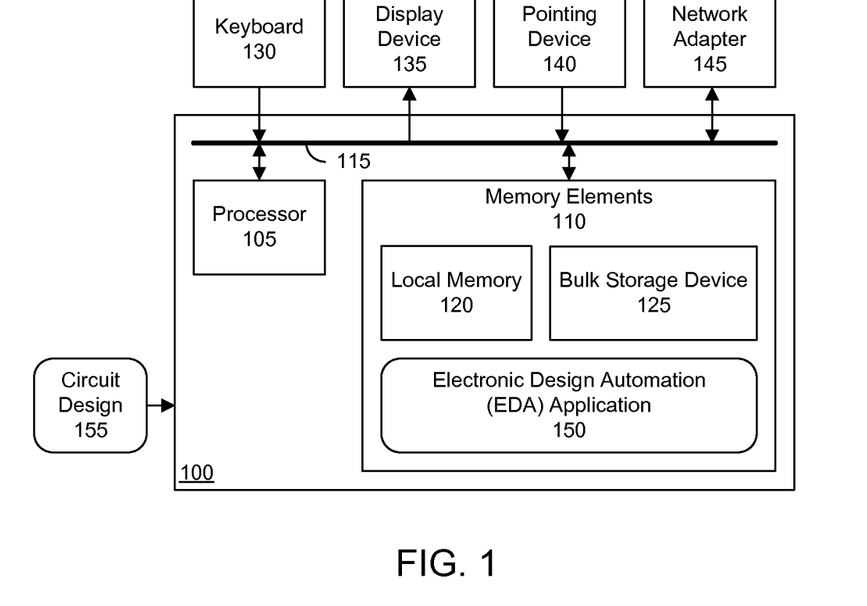
FIG. 1 is a block diagram illustrating an exemplary data processing system.

FIG. 1 is a block diagram illustrating an exemplary data processing system (system) 100. System 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a computer or other apparatus suitable for storing and/or executing program code. It should be appreciated, however, that system 100 may be implemented in the form of any system including a processor and memory that is capable of performing and/or initiating the operations described within this disclosure.

Memory elements 110 include one or more physical memory devices such as, for example, a local memory 120 and a bulk storage device 125. Local memory 120 refers to random access memory (RAM) or other non-persistent memory devices generally used during actual execution of the program code. Bulk storage device 125 may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 optionally may be coupled to system 100. The I/O devices may be coupled to system 100 either directly or through intervening I/O controllers. A network adapter 145 may also be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that may be used with system 100.

As pictured in FIG. 1, memory elements 110 store an electronic design automation (EDA) application 150. EDA application 150, being implemented in the form of executable program code, is executed by system 100. As such, EDA application 150 is considered an integrated part of system 100. System 100, while executing EDA application 150, receives and operates upon a circuit design 155.

Circuit design 155 is a programmatic description of circuitry to be implemented within an IC. For example, circuit design 155 may be specified in Register transfer level (RTL) form using a hardware description language. In another example, circuit design 155 may be specified as a netlist. A netlist may be represented as a directed graph.

EDA application 150, circuit design 155, and any data items used, generated, and/or operated upon by system 100 are functional data structures that impart functionality when employed as part of system 100 or when such elements, including derivations thereof, are loaded into an IC such as a programmable IC or used to implement an IC.

Figure 2:
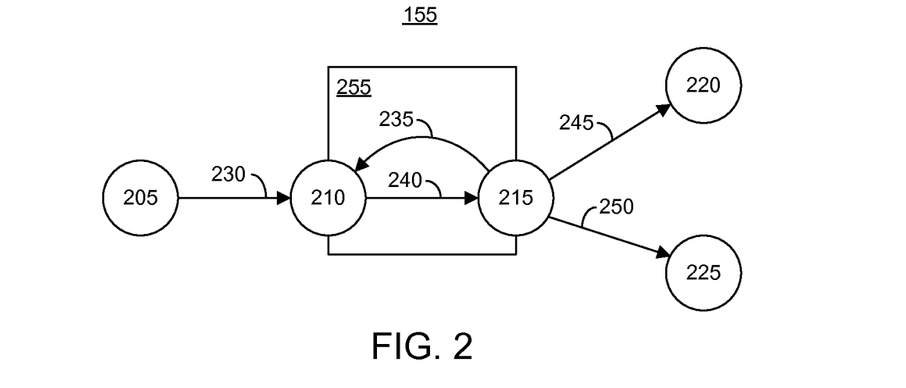
FIG. 2 is an exemplary implementation of the circuit design of FIG. 1 as a directed graph.

FIG. 2 is an exemplary implementation of circuit design 155 of FIG. 1 as a directed graph. As noted, circuit design 155 may be specified in RTL form, as a netlist, or the like. If in RTL form, circuit design 155 may be converted or translated into a netlist through a synthesis process. As noted, a netlist may be represented as, and is an example of, a directed flow graph.

A directed flow graph is formed of a set of nodes connected by edges. The edges have a direction. A directed edge is an edge defined by an ordered pair of nodes such as (source node, destination node). The nodes generally represent synchronous circuit components of a circuit design such as flip-flops, registers, look-up tables (LUTs), memories, digital signal processors (DSPs), or the like. The edges represent signals exchanged between the nodes and, therefore, represent data paths of the circuit design.

Referring to FIG. 2 with particularity, circuit design 155 includes nodes 205, 210, 215, 220, and 225. Circuit design 155 further includes edges 230, 235, 240, 245, and 250. As noted, edges may be defined by a pair of nodes including the source node and the destination node. For example, edge 230 may also be defined as edge (205, 210). It should be appreciated that FIG. 2 is provided for purposes of illustration only. A circuit design such as circuit design 155 may include a larger number of nodes and a larger, more complex series of edges than pictured in FIG. 2.

System 100 is able to process circuit design 155 and distinguish between feed-forward paths and loop paths of circuit design 155. As defined within this disclosure, the term "feed-forward path" means two nodes of a directed graph joined by one edge in a single direction. Examples of feed-forward paths include edges 230, 245, and 250.

As defined herein, the term "loop path" means a serial series of one or more nodes and one or more linking edges within a directed graph that, from a designated starting node, exits the starting node and arrives back at the starting node. One example of a loop path is where two nodes are joined by two edges in opposing directions. Referring to FIG. 2, node 210 has edge 240 leaving to node 215. Node 215 also has edge 235 leaving to node 210. Because nodes 210 and 215 are joined by edges of opposing directions, nodes 210 and 215 are said to be joined or coupled by a loop path 255. Loop paths, however, may include more than two nodes. Another example of a loop path is where a single node has an edge that exits the node and loops back around to the node. Loop paths are found in circuits such as counters where on each cycle, a result of a prior cycle is increased by one. Other examples of loop paths may be found within finite state machines.

In one aspect, system 100 may process a circuit design such as circuit design 155. System 100 may identify feed-forward paths and loop paths within circuit design 155. System 100 may process circuit design 155 and apply different processes and/or techniques to circuit design 155 that are dependent, at least in part, upon the distinction between feed-forward paths and loop paths. Feed-forward paths also may be pipelined in some cases in order to meet a target operating frequency (target frequency) for circuit design 155.

Figure 3:
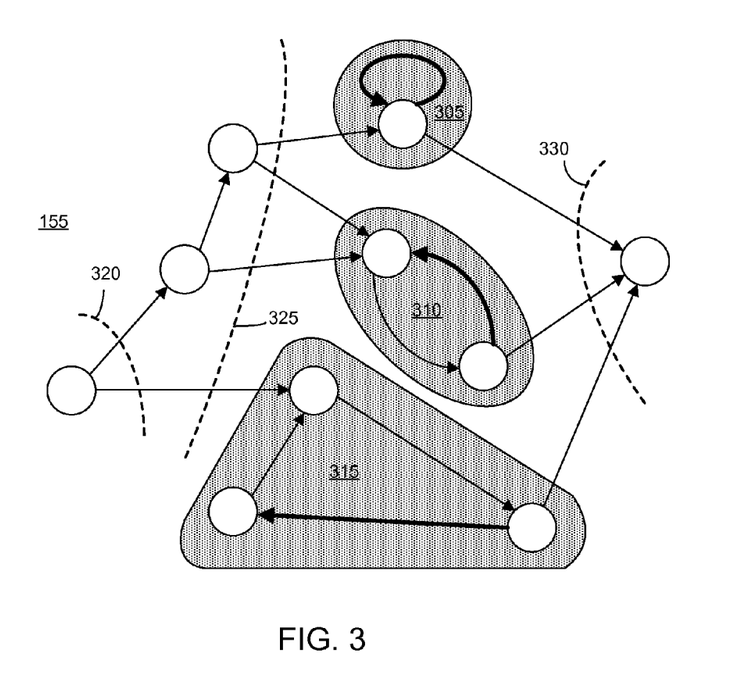
FIG. 3 is another exemplary implementation of the circuit design of FIG. 1 as a directed graph.

FIG. 3 is another exemplary implementation of circuit design 155 of FIG. 1 as a directed graph. FIG. 3 illustrates a more complex example than pictured in FIG. 2. Referring to FIG. 3, circuit design 155 includes a plurality of nodes coupled by edges. Circuit design 155 includes three different exemplary loop paths shown with shading as loop paths 305, 310, and 315. FIG. 3 also illustrates an aspect of pipeline processing relating to pipeline stage estimation and pipeline stage insertion. Pipeline cuts 320, 325, and 330 are introduced into circuit design 155 to indicate the feed-forward paths in which pipeline stages may be introduced and/or inserted. Further details relating to pipeline stage estimation and insertion are described with reference to FIG. 4 below.

Figure 4:
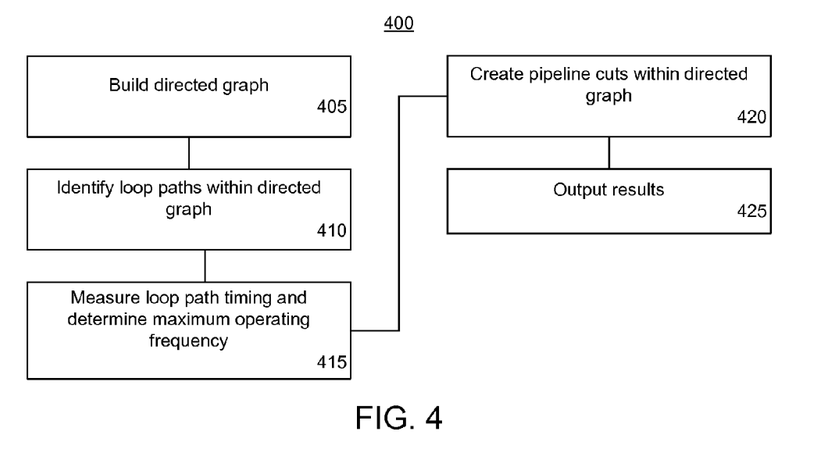
FIG. 4 is a flow chart illustrating an exemplary method of estimating pipeline stages for a circuit design.

FIG. 4 is a flow chart illustrating an exemplary method 400 of estimating pipeline stages for a circuit design. Method 400 may be performed by the system of FIG. 1. In block 405, the system builds a directed graph representation of the circuit design. It should be appreciated that while a netlist is a type of directed graph, in some cases, the netlist may be processed or optimized for purposes of implementing a design flow. Block 405 may represent operations performed on the circuit design whether the operations are performed to convert the circuit design from another format to a netlist format, optimize the circuit design already in netlist format, or the like.

In block 410, the system identifies loop paths within the directed graph. Those paths not identified as loop paths are determined to be feed-forward paths. Block 410 illustrates a process of distinguishing between loop paths and feed-forward paths in the circuit design. As discussed, a loop path exists where, following directed edges leaving a starting node, a path exists that leads back to the starting node.

In block 415, the system measures, or estimates, the timing of the loop paths. Because loop paths may not be pipelined, the timing of the loop paths determines the maximum operating frequency of the circuit design. As such, from the measured timing of the loop paths, the system may determine a maximum operating frequency for the circuit design. The maximum operating frequency of the circuit design, for example, will be dependent upon the slowest loop path. The determined maximum operating frequency is calculated with the presumption that the feed-forward paths may be pipelined to meet the maximum operating frequency determined from the loop paths.

In block 420, the system creates pipeline cuts within the directed graph. In general, the system introduces a pipeline cut into the circuit design that slices, or cuts, across a largest number of critical paths, i.e., critical edges, while preserving data ordering. Criticality is determined using the maximum operating frequency estimated in block 415. As discussed, the pipeline cuts are illustrated using dotted lines in FIG. 3. Pipeline cuts are added into the circuit design until no further critical feed-forward paths are slower than the loop paths. In block 425, the system outputs, or stores, the results.

Figure 5:
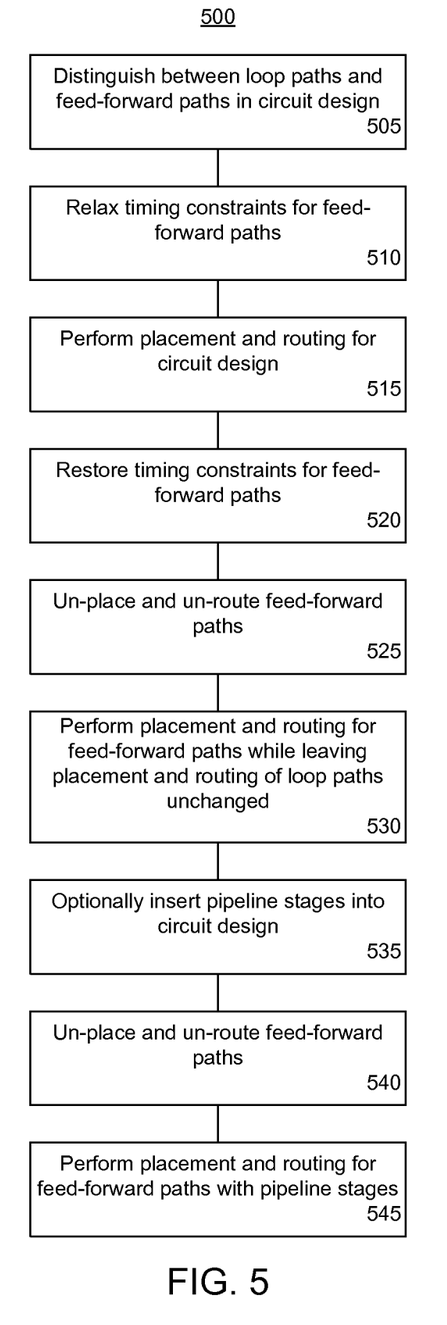
FIG. 5 is a flow chart illustrating a method of processing a circuit design.

FIG. 5 is a flow chart illustrating a method 500 of processing a circuit design. Method 500 is an exemplary design flow for implementing a circuit design that may be performed by the system of FIG. 1. Method 500 is presented for purposes of illustration and is not intended as a limitation of the inventive arrangements described within this disclosure. For example, one or more blocks of method 500 may be performed on an "as-needed" or optional basis. One or more of blocks 500 may be performed depending upon a result of one or more intermediate determinations or other analysis performed by system 100 not illustrated in FIG. 5. Further examples of the operations illustrated in FIG. 5 are described in further detail with reference to the remaining figures.

Method 500 may be performed by a system as described with reference to FIG. 1. Further, method 500 may begin in a state where a circuit design, specified as a netlist, is loaded into the system. Accordingly, in block 505, the system distinguishes between loop paths and feed-forward paths in the circuit design. In general, the system identifies loop paths as instances within the circuit design where a first node has a directed edge to a second node and the second node has a directed edge back to the first node. The second node may also have a directed edge back to the first node through one or more other nodes.

In block 510, the system relaxes timing constraints for the feed-forward paths. As defined herein, a "timing constraint" is a requirement for a signal of a circuit design to propagate from one node of a circuit design to a next node of the circuit design. For example, in the case of a netlist, a timing constraint imposes a maximum amount of time allowed for a signal to traverse from a source node, e.g., a synchronous element, to a destination node, e.g., another synchronous element. The timing constraint specifies a maximum amount of time for a signal to traverse an edge connecting a source node and the destination node.

In some cases, timing constraints on feed-forward paths are more restrictive than timing constraints on loop paths. A feed-forward path having a more restrictive timing constraint than a loop path is prioritized during placement and routing. Whereas feed-forward paths, however, may be pipelined to increase the operating frequency of the feed-forward path, loop paths may not.

Accordingly, the timing constraints on feed-forward paths may be relaxed to an extent that competition for placement and routing resources between feed-forward paths and loop paths is reduced. For example, a timing constraint for a feed-forward path may be relaxed by doubling or tripling the maximum amount of time permitted for the feed-forward path. In another example, the timing constraints for feed-forward paths may be relaxed to be less restrictive than the timing constraints of the loop paths. In still another example, timing constraints for feed-forward paths may be relaxed by entirely removing the timing constraints. Thus, as defined herein, "relaxing" a timing constraint means making the timing constraint less restrictive. For example, relaxing a timing constraint means increasing the amount of time allowed by the timing constraint, removing the timing constraint entirely from the circuit design and/or rendering the timing constraint to have no effect upon placement and/or routing. In any case, the original timing constraints are stored for subsequent recall and use.

With timing constraints for feed-forward paths sufficiently relaxed, the system gives loop paths higher priority for placement and access to routing resources, e.g., wires, than feed-forward paths during placement and routing. As such, a placement and routing process implemented when timing constraints for the feed-forward paths are relaxed is more likely to result in optimized placements and/or routing for the loop paths. Sub-optimal placement and/or routing for feed-forward paths may be overcome through pipelining, which may be used to increase the achievable operating frequency (achievable frequency) of the circuit design. Obtaining an optimized placement and routing for the loop paths provides a clearer picture of the achievable frequency for the circuit design since the limiting factor for operating frequency may be the delay of the loop paths.

In block 515, the system performs placement and routing for the circuit design. As defined herein, the term "placement" is the process of assigning components of a circuit design to exact locations on an IC. For example, the nodes of the circuit design are assigned to particular locations on the IC, or a representation of the target IC. As defined herein, the term "routing" is the process of adding or selecting wires to establish connections between placed circuit components. Wires may be created or defined in the case of an application specific IC. In the case of a programmable IC, e.g., a field programmable gate array (FPGA), wires are selected since the IC includes pre-existing routing resources such as wires and programmable interconnection points for use in routing.

In block 520, the system restores the timing constraints for the feed-forward paths that were relaxed in block 510. The timing constraints may be restored to their original form as the timing constraints existed prior to implementation of block 510. In block 525, the system un-places and un-routes the feed-forward paths. The loop paths, however, are left in place and untouched. In block 530, the system performs placement and routing for the feed-forward paths. The system performs placement and routing for the feed-forward paths while leaving the placement and routing of the loop paths unchanged. Block 530 may be considered an incremental place and route process for the circuit design since less than the entirety of the circuit design is placed and routed.

In another exemplary implementation, the system may relax timing constraints of feed-forward paths by removing the feed-forward paths from the circuit design once identified in block 505. The circuit design is left with loop paths and associated timing constraints. Timing constraints for feed-forward paths are effectively removed or rendered ineffectual for subsequent placement and routing operations, which are performed upon the remaining loop paths of the circuit design. The system performs placement and routing on the loop paths thereby implementing the loop paths. The system may determine timing of the implemented loop paths and store the placement and routing of the loop paths. The system may then read the original circuit design, use the stored placement and routing to implement the loop-paths, and then implement the feed-forward paths. For example, subsequent to reading the circuit design and using the stored placement and routing for the loop paths, method 500 may skip to block 530 where the feed-forward paths are implemented.

In block 535, the system may optionally insert pipeline stages into the circuit design. More particularly, the system may insert pipeline stages into the feed-forward paths of the circuit design automatically thereby increasing the achievable frequency of the circuit design. In block 540, the system may un-place and un-route the feed-forward paths. The feed-forward paths, however, still include pipeline stages added in block 535. In block 545, the system performs placement and routing for the feed-forward paths with the pipeline stages. The system leaves placement and routing of loop paths unchanged while performing placement and routing of feed-forward paths in block 545.

Figure 6:
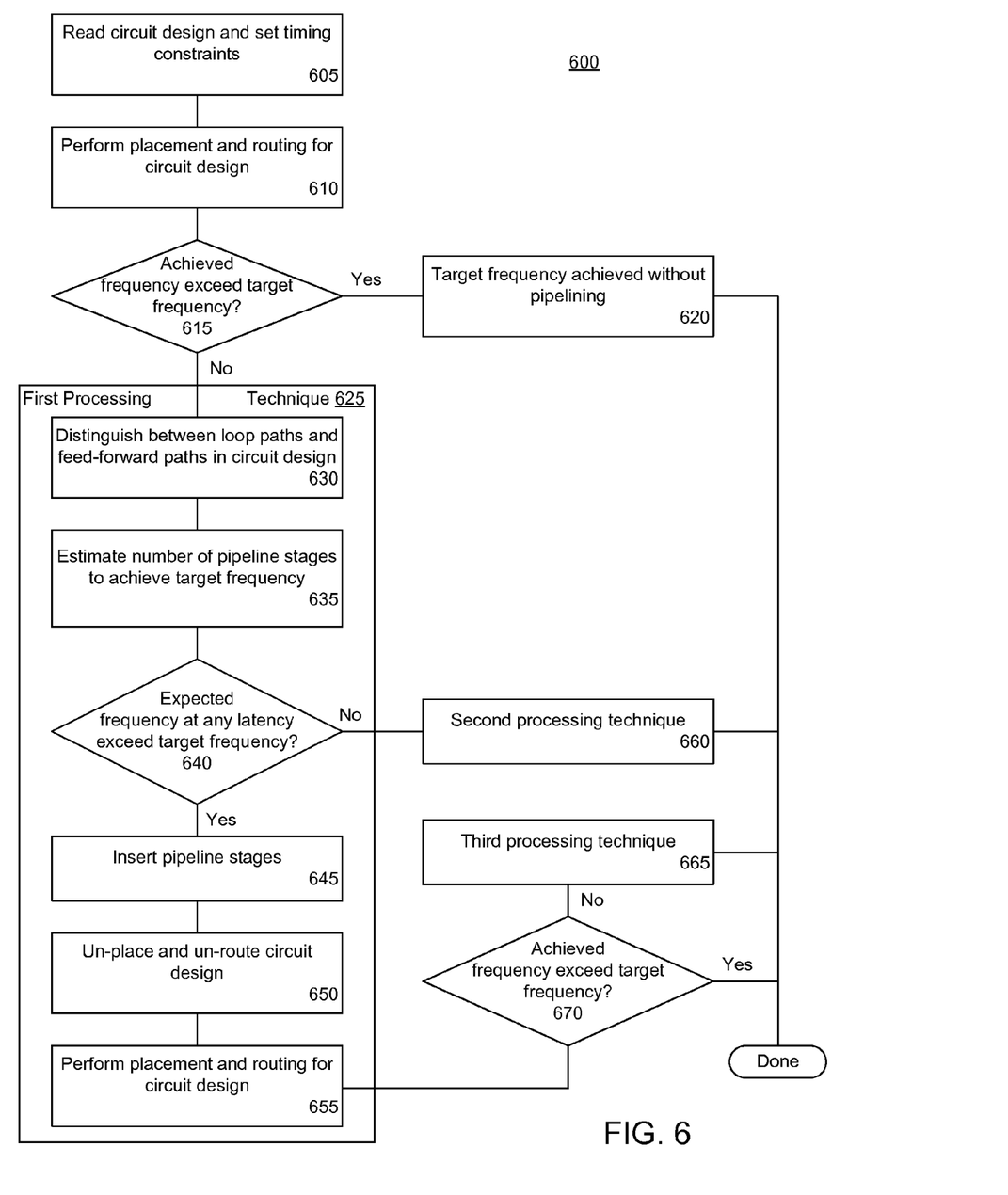
FIG. 6 is a flow chart illustrating a method of processing a circuit design.

FIG. 6 is a flow chart illustrating a method 600 of processing a circuit design. Method 600 is an exemplary design flow for implementing a circuit design that may be performed by the system of FIG. 1. The design flow illustrated by method 600 addresses several different design scenarios that will be discussed in greater detail below. Method 600 further incorporates various operations described with reference to FIG. 5, albeit in different combinations than previously described.

In block 605, the system reads the circuit design and sets the timing constraints for the circuit design. In block 610, the system performs placement and routing for the circuit design.

In block 615, the system performs timing analysis upon the placed and routed circuit design. The system determines whether an achieved frequency of the circuit design exceeds a target frequency of the circuit design. If so, method 600 continues to block 620. In block 620, the system determines that the target frequency is achieved without the need for pipelining. After block 620, method 600 may end. In the case where the target frequency is not achieved, method 600 proceeds from block 615 to block 625.

Block 625 represents a first processing technique that is applied to the circuit design. The first processing technique attempts to meet the timing constraints for the circuit design through pipelining without attempting to derive an optimized placement and routing of the loop paths.

In block 630, the system distinguishes between loop paths and feed-forward paths in the circuit design. In block 635, the system estimates the number of pipeline stages needed to achieve the target frequency of the circuit design. For example, the system may perform a procedure similar to that described with reference to FIG. 4. The system may estimate the expected operating frequency of the circuit design for each latency, e.g., pipeline stage, added to the circuit design until the estimated latency of the circuit design reaches a maximum latency specified for the circuit design. Maximum latency is reached when the frequency is limited by the loop-paths. More particularly, maximum latency is reached when, after pipelining, feed-forward paths become faster than the loop paths in the circuit design. For each incrementally added latency, or pipeline stage, an expected operating frequency is derived or calculated. The system generates a report specifying the pipeline stage added, the latency, and the expected operating frequency.

In block 640, the system determines whether the expected operating frequency for any of the latencies determined in block 634 from the report exceeds the target frequency. If so, method 600 continues to block 645. If not, method 600 proceeds to block 660 to perform a second processing technique. After performing block 660, which will be described in greater detail herein, method 600 may end.

Continuing with block 645, the system inserts the pipeline stages for the particular latency determined in block 640 that meets or exceeds the target frequency into the circuit design. The system inserts pipeline stages automatically into the feed-forward paths, e.g., along the pipeline cuts. As discussed, loop paths may not be pipelined. For example, the system inserts registers to create each pipeline stage in accordance with the pipeline cuts in the directed graph.

In block 650, the system un-places and un-routes the circuit design. In block 655, the system performs placement and routing for the circuit design. The system performs placement and routing for the circuit design with the pipeline stages inserted for the feed-forward paths. The system performs placement and routing for the entire circuit design, e.g., for both loop paths and feed-forward paths.

In another exemplary implementation, pipelining may be performed incrementally. With incremental pipelining, the entire circuit design need not be un-placed and un-routed as described with reference to blocks 650 and 655. Instead, the system may un-place and un-route locally, then perform placement and routing locally. For example, the system may un-place and un-route only the nodes and nets affected by the change, i.e., the local portions of the circuit design in which pipeline stages are inserted. The system then may perform placement and routing on a local level only for the nodes and nets previously un-placed and un-routed in which pipeline stages are inserted. In some cases, a net may be pipelined that already traverses through a site of the IC that includes an unused, or empty, register. In that case, the system need not un-place or un-route the net. The system may place the new register at the unused, or empty, site while maintaining the existing placement and routing for the nodes and nets.

Continuing to block 670, the system determines whether the achieved frequency exceeds the target frequency for the circuit design. If so, method 600 may end. If not, method 600 may continue to block 665 where a third technique is performed. After block 665, method 600 may end.

Figure 7:
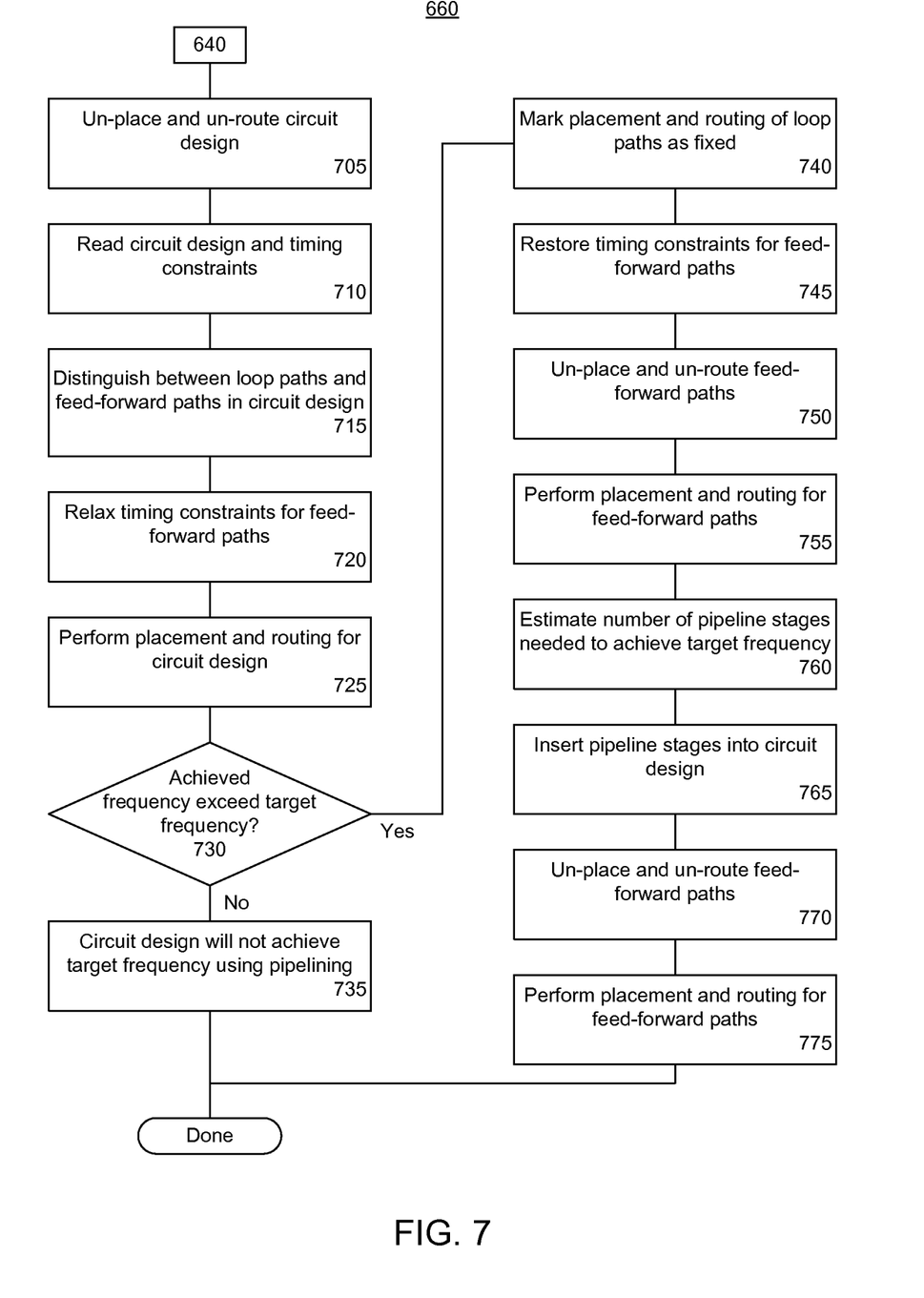
FIG. 7 is a flow chart illustrating a more detailed implementation of a processing technique illustrated in FIG. 6.

FIG. 7 is a flow chart illustrating a more detailed implementation of a processing technique illustrated in FIG. 6.

FIG. 7 is an exemplary implementation of the operations performed as represented by block 660 of FIG. 6 and also referred to as processing technique 660. Processing technique 660 addresses the situation where the placement and routing for the loop paths is not optimized. Because the loop paths are not optimized and do not meet the timing requirements for the circuit design, e.g., the loop paths are slower than the timing requirements, pipelining the circuit design will not help in achieving the target frequency.

Accordingly, processing technique 660 begins in block 705 from block 640. In block 705, the system un-places and un-routes the circuit design. In block 710, the system reads the circuit design and the timing constraints for the circuit design. In block 715, the system distinguishes between loop paths and feed-forward paths in the circuit design. In block 720, the system relaxes timing constraints for the feed-forward paths. As discussed, relaxing timing constraints may include entirely removing the timing constraints for the feed-forward paths. Thus, any loop paths with timing constraints that were less stringent than timing constraints of feed-forward paths become more stringent than timing constraints of feed-forward paths by comparison after block 720, thereby providing the loop paths with higher priority than the feed-forward paths.

In block 725, the system performs placement and routing for the circuit design. Placement and routing is performed for the entire circuit design with the relaxed timing constraints in place for the feed-forward paths. In block 730, the system determines whether the achieved frequency of the circuit design exceeds the target frequency of the circuit design. If so, method 700 proceeds to block 740. If not, method 700 proceeds to block 735. In block 735 the system determines that the circuit design will not achieve the target frequency using pipelining. Such is the case if loop paths failed to meet timing constraints despite being optimized to do so.

Continuing with block 740, the system marks the placement and routing of loop paths as fixed. As such, the system will not un-place, un-route, or otherwise alter the placement and/or routing for loop paths during subsequent incremental place and route operations.

In block 745 the system restores timing constraints for the feed-forward paths. In block 750, the system un-places and un-routes the feed-forward paths. In block 755, the system performs placement and routing for the feed-forward paths of the circuit design. As noted, the loop paths remain intact and unchanged.

In block 760, the system estimates the number of pipelined stages needed to achieve the target frequency for the circuit design. In block 765 the system inserts the pipeline stages determined in block 760 into the circuit design automatically. More particularly, the system inserts the pipeline stages into the feed-forward paths of the circuit design as determined from block 760.

In block 770 the system un-places and un-routes feed-forward paths of the circuit design. In block 775, the system performs placement and routing for the feed-forward paths. The system performs placement and routing for the feed-forward paths with the pipeline stages having been inserted. After block 775, processing technique for 660 ends.

Figure 8:
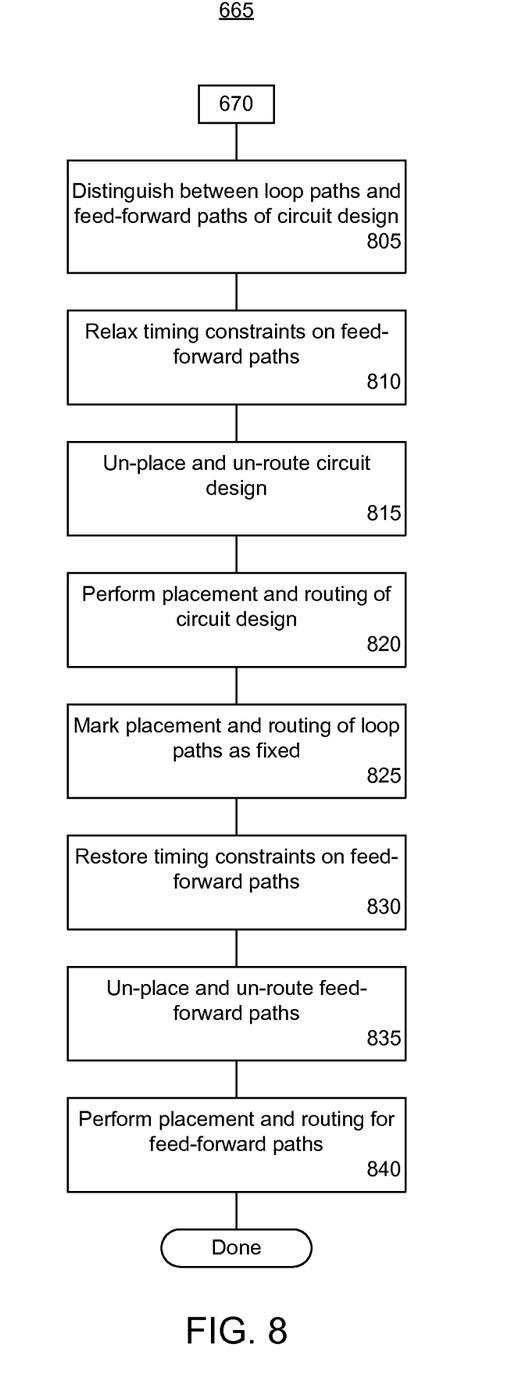
FIG. 8 is a flow chart illustrating a more detailed implementation of another processing technique illustrated in FIG. 6.

FIG. 8 is a flow chart illustrating a more detailed implementation of another processing technique illustrated in FIG. 6. FIG. 8 is an exemplary implementation of the operations performed as represented by block 665 of FIG. 6 and also referred to as processing technique 665. Processing technique 665 addresses the scenario where the loop paths were implemented, e.g., placed and routed, in an optimal manner and meet the target frequency for the circuit design. Accordingly, referring to method 600, the system inserts pipeline stages into the circuit design in block 645. Upon performing placement and routing in block 655, however, the resulting circuit design does not meet timing constraints. There is no guarantee that, when placement and routing is performed in block 655, that the loop paths will again be placed and routed in an optimal manner. Processing technique 665 addresses this scenario.

Accordingly, proceeding from block 670 of FIG. 6, in block 805, the system distinguishes between loop paths and feed-forward paths in the circuit design. In block 810, the system relaxes timing constraints for the feed-forward paths of the circuit design. As noted, relaxing timing constraints may include entirely removing timing constraints from the feed-forward paths.

In block 815, the system un-places and un-routes the circuit design. The system un-places and un-routes both loop paths and feed-forward paths. In block 820, the system performs placement and routing for the circuit design. The system performs placement and routing for both loop paths and for feed-forward paths of the circuit design. Placement and routing is performed for the feed-forward paths, for example, using the relaxed timing constraints.

In block 825, the system marks the placement and routing of loop paths as fixed. In block 830, the system restores timing constraints for the feed-forward paths. In block 835, the system un-places and un-routes the feed-forward paths of the circuit design. In block 840 the system performs placement and routing for the feed-forward paths of the circuit design. After block 840, processing technique 665 may end.

FIGS. 6-8, taken collectively, illustrate an exemplary design flow for processing a circuit design. The design flow utilizes various techniques to ensure that loop paths are placed and routed in an optimal manner and that pipeline stages are inserted automatically by the system in cases where pipelining is determined to be helpful in reaching the target frequency for the circuit design for feed-forward paths. Those skilled in the art will recognize that other variations of the design flow utilizing the various operations described within this specification may be implemented.

The inventive arrangements described within this disclosure may be applied and/or used for high level synthesis flows for programmable ICs and/or for ASIC design flows. High level synthesis flow refers to a design flow in which synthesis is performed upon algorithmic input (e.g., a high level programming language such as C/C++/SystemC, or other variant thereof), behavioral input (e.g., a hardware description language input or specification of a circuit design), or the like specifying a circuit design.

Programmable ICs may be programmed to perform specified functions. One example of an IC that can be programmed is an FPGA. An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuitries are typically programmed by loading a stream of configuration data into internal configuration memory cells that define how the programmable elements are configured. The configuration data may be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to these devices and further may encompass devices that are only partially programmable. For example, one type of programmable IC includes a combination of hard-coded transistor logic and a programmable switch fabric that programmably interconnects the hard-coded transistor logic.

Figure 9:
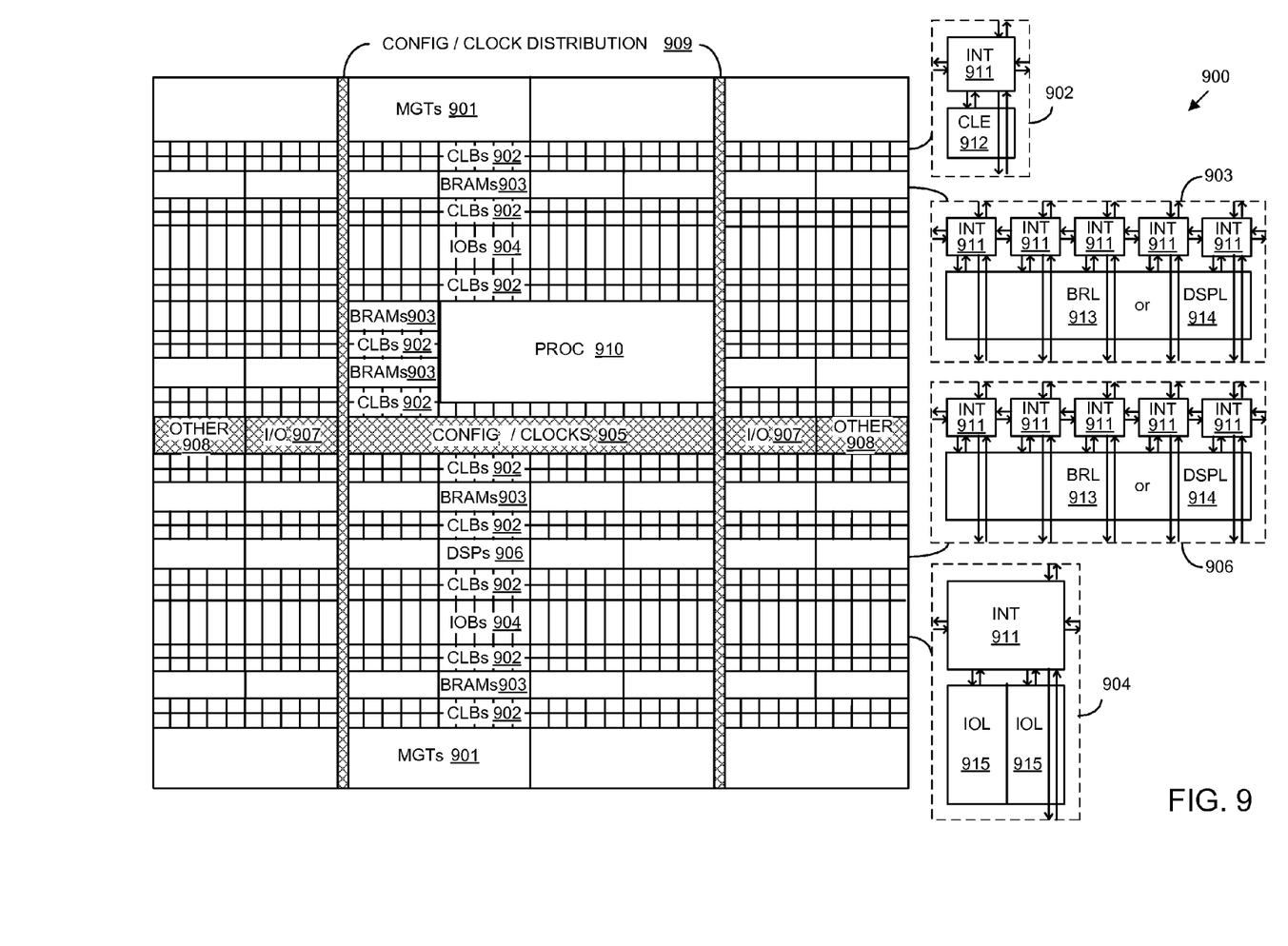
FIG. 9 is a block diagram illustrating an exemplary architecture for an integrated circuit.

FIG. 9 is a block diagram illustrating an exemplary architecture 900 for an IC. In one aspect, architecture 900 is implemented within an FPGA type of IC. Architecture 900 is also representative of an SOC type of IC. As noted, an SOC is an IC that includes a processor that executes program code and one or more other circuits and/or circuit systems. The circuits and/or circuit systems may operate cooperatively with one another and with the processor. The inventive arrangements may be applied to a circuit design that may be implemented within an IC having the architecture 900 illustrated in FIG. 9.

As shown, architecture 900 includes several different types of programmable circuit, e.g., logic, blocks. For example, architecture 900 may include a large number of different programmable tiles including multi-gigabit transceivers (MGTs) 901, configurable logic blocks (CLBs) 902, BRAMs 903, IOBs 904, configuration and clocking logic (CONFIG/CLOCKS) 905, DSPs 906, specialized I/O blocks 907 (e.g., configuration ports and clock ports), and other programmable logic 908 such as digital clock managers, analog-to-digital converters, system monitoring logic, and so forth.

In some ICs, each programmable tile includes a programmable interconnect element (INT) 911 having standardized connections to and from a corresponding INT 911 in each adjacent tile. Therefore, INTs 911, taken together, implement the programmable interconnect structure for the illustrated IC. Each INT 911 also includes the connections to and from the programmable logic element within the same tile, as shown by the examples included at the top of FIG. 9.

For example, a CLB 902 may include a configurable logic element (CLE) 912 that may be programmed to implement user logic plus a single INT 911. A BRAM 903 may include a BRAM logic element (BRL) 913 in addition to one or more INTs 911. Typically, the number of INTs 911 included in a tile depends on the height of the tile. As pictured, a BRAM tile has the same height as five CLBs, but other numbers (e.g., four) may also be used. A DSP tile 906 may include a DSP logic element (DSPL) 914 in addition to an appropriate number of INTs 911. An IOB 904 may include, for example, two instances of an I/O logic element (IOL) 915 in addition to one instance of an INT 911. As will be clear to those of skill in the art, the actual I/O pads connected, for example, to IOL 915 typically are not confined to the area of IOL 915.

In the example pictured in FIG. 9, a columnar area near the center of the die, e.g., formed of regions 905, 907, and 908, may be used for configuration, clock, and other control logic. Horizontal areas 909 extending from this column are used to distribute the clocks and configuration signals across the breadth of the programmable IC.

Some ICs utilizing the architecture illustrated in FIG. 9 include additional logic blocks that disrupt the regular columnar structure making up a large part of the IC. The additional logic blocks may be programmable blocks and/or dedicated circuitry. For example, a processor block depicted as PROC 910 spans several columns of CLBs and BRAMs.

In one aspect, PROC 910 is implemented as a dedicated circuitry, e.g., as a hard-wired processor, that is fabricated as part of the die that implements the programmable circuitry of the IC. PROC 910 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 910 is omitted from architecture 900 and replaced with one or more of the other varieties of the programmable blocks described. Further, such blocks may be utilized to form a "soft processor" in that the various blocks of programmable circuitry may be used to form a processor that executes program code as is the case with PROC 910.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 9 that are external to PROC 910 such as CLBs 902 and BRAMs 903 are considered programmable circuitry of the IC. Programmable circuitry may be configured or programmed to implement different physical circuits therein.

In general, the functionality of programmable circuitry is not established until configuration data is loaded into the IC. A set of configuration bits may be used to program programmable circuitry of an IC such as an FPGA. The configuration bit(s) are typically referred to as a "configuration bitstream." In general, programmable circuitry is not operational or functional without first loading a configuration bitstream into the IC. The configuration bitstream effectively implements or instantiates a particular physical circuit within the programmable circuitry. The configuration bitstream or circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 910.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

FIG. 9 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 9 are purely exemplary. In an actual IC, for example, more than one adjacent column of CLBs may be included wherever the CLBs appear, to facilitate the efficient implementation of a user circuit design. The number of adjacent CLB columns, however, may vary with the overall size of the IC. Further, the size and/or positioning of blocks such as PROC 910 within the IC are for purposes of illustration only and are not intended as a limitation.

The inventive arrangements described within this specification provide various processing techniques for circuit designs for increasing operating frequency. The processing techniques utilize automatic pipelining when applicable and special handling and/or treatment of loop paths and feed-forward paths. By effectively prioritizing the placement and routing of loop paths, insertion of pipeline stages may be performed in those cases where pipelining is deemed more likely to result in an achieved frequency for the circuit design that meets or exceeds the target frequency.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

As defined herein, the term "automatically" means without user intervention. As defined herein, the term "user" means a human being. The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when," "upon," "in response to determining," "in response to detecting," "responsive to determining," or "responsive to detecting," depending on the context. Similarly, the phrase "if it is determined" or the phrase "if [a stated condition or event] is detected" may be construed to mean "upon determining," "in response to determining," "responsive to determining," "upon detecting [the stated condition or event]," "in response to detecting [the stated condition or event]," or "responsive to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer-readable storage medium" means a storage medium that contains or stores program code for use by or in connection with an instruction execution system, apparatus, or device. As defined herein, a "computer-readable storage medium" is non-transitory and, as such, is not a transitory propagating signal per se. Examples of computer-readable storage media may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

In one aspect, the blocks in the flow chart illustration may be performed in increasing numeric order corresponding to the numerals in the various blocks. In other aspects, the blocks may be performed in an order that is different, or that varies, from the numerals in the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in subsequent or other blocks that do not immediately follow.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

A method includes determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths using a processor. A second placement and routing is performed on the loop paths and the feed-forward paths of the circuit design.

In one aspect, relaxing timing constraints includes removing timing constraints from the circuit design. In another aspect, relaxing timing constraints includes removing the feed-forward paths from the circuit design.

The method may include restoring the timing constraints of the feed-forward paths, un-placing and un-routing the feed-forward paths, and performing a further placement and routing of the feed-forward paths of the circuit design while leaving the second placement and routing of loop paths unchanged.

The method may also include inserting pipeline stages for feed-forward paths, un-placing and un-routing the feed-forward paths, and performing a further placement and routing of the feed-forward paths with the pipeline stages.

In another aspect, the method may include estimating a number of pipelined stages to achieve the target operating frequency.

The method may further include inserting the pipelined stages into the feed-forward paths of the circuit design, un-placing and un-routing the circuit design, and performing a further placement and routing for the circuit design with the pipeline stages.

The method may also include, responsive to determining that the circuit design does not achieve a target operating frequency after performing placement and routing, indicating that pipelining the circuit design does not achieve the target operating frequency.

A system includes a processor programmed to initiate executable operations. The executable operations include determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths. A second placement and routing is performed on the loop paths and the feed-forward paths of the circuit design.

In one aspect, relaxing timing constraints includes removing timing constraints from the circuit design. In another aspect, relaxing timing constraints includes removing the feed-forward paths from the circuit design.

The processor may be programmed to initiate executable operations including restoring the timing constraints of the feed-forward paths, un-placing and un-routing the feed-forward paths, and performing a further placement and routing of the feed-forward paths of the circuit design while leaving the second placement and routing of loop paths unchanged.

The processor may also be programmed to initiate executable operations including inserting pipeline stages for feed-forward paths, un-placing and un-routing the feed-forward paths, and performing a further placement and routing of the feed-forward paths with the pipeline stages.

In another aspect, the processor may be programmed to initiate executable operations including estimating a number of pipelined stages to achieve the target operating frequency.

The processor may further be programmed to initiate executable operations including inserting the pipelined stages into the feed-forward paths of the circuit design, un-placing and un-routing the circuit design, and performing a further placement and routing for the circuit design with the pipeline stages.

The processor may also be programmed to initiate executable operations including, responsive to determining that the circuit design does not achieve a target operating frequency after performing placement and routing, indicating that pipelining the circuit design does not achieve the target operating frequency.

A non-transitory computer-readable storage medium has instructions stored thereon which, when executed by a processor, perform a method. The method includes determining that an operating frequency for a first placement and routing for a circuit design does not exceed a target operating frequency, distinguishing between loop paths and feed-forward paths in the circuit design, and, responsive to determining that the operating frequency does not exceed the target operating frequency, relaxing timing constraints of the feed-forward paths. A second placement and routing is performed on the loop paths and the feed-forward paths of the circuit design.

In one aspect, relaxing timing constraints includes removing timing constraints from the circuit design. In another aspect, relaxing timing constraints includes removing the feed-forward paths from the circuit design.

The method may include restoring the timing constraints of the feed-forward paths, un-placing and un-routing the feed-forward paths, and performing a further placement and routing of the feed-forward paths of the circuit design while leaving the second placement and routing of loop paths unchanged.

The method may also include inserting pipeline stages for feed-forward paths, un-placing and un-routing the feed-forward paths, and performing a further placement and routing of the feed-forward paths with the pipeline stages.

In another aspect, the method may include estimating a number of pipelined stages to achieve the target operating frequency.

The method further may include inserting the pipelined stages into the feed-forward paths of the circuit design, un-placing and un-routing the circuit design, and performing a further placement and routing for the circuit design with the pipeline stages.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   determining that an operating frequency for a first placement and routing for a circuit design does not exceed a target operating frequency;
   distinguishing between loop paths and feed-forward paths in the circuit design;
   responsive to determining that the operating frequency does not exceed the target operating frequency, relaxing timing constraints of the feed-forward paths using a processor;
   performing a second placement and routing on the loop paths and the feed-forward paths of the circuit design using the processor, wherein the loop paths are prioritized from the relaxing of the timing constraints during the second placement and routing; and
   configuring an integrated circuit with the circuit design resulting from the second placement and routing.

2. The method of claim 1, wherein relaxing timing constraints comprises:
   removing timing constraints from the circuit design.

3. The method of claim 1, wherein relaxing timing constraints comprises:
   removing the feed-forward paths from the circuit design.

4. The method of claim 1, further comprising:
   restoring the timing constraints of the feed-forward paths;
   un-placing and un-routing the feed-forward paths; and
   performing a further placement and routing of the feed-forward paths of the circuit design while leaving the second placement and routing of loop paths unchanged.

5. The method of claim 1, further comprising:
   inserting pipeline stages for feed-forward paths;
   un-placing and un-routing the feed-forward paths; and
   performing a further placement and routing of the feed-forward paths with the pipeline stages.

6. The method of claim 1, further comprising:
   estimating a number of pipelined stages to achieve the target operating frequency.

7. The method of claim 6, further comprising:
   inserting the pipelined stages into the feed-forward paths of the circuit design;
   un-placing and un-routing the circuit design; and
   performing a further placement and routing for the circuit design with the pipeline stages.

8. A system, comprising:
   a processor programmed to initiate executable operations comprising:
   determining that an operating frequency for a first placement and routing for a circuit design does not exceed a target operating frequency;
   distinguishing between loop paths and feed-forward paths in the circuit design;
   responsive to determining that the operating frequency does not exceed the target operating frequency, relaxing timing constraints of the feed-forward paths;
   performing a second placement and routing on the loop paths and the feed-forward paths of the circuit design wherein loop paths are prioritized from the relaxing of the timing constraints during the second placement and routing; and
   configuring an integrated circuit with the circuit design resulting from the second placement and routing.

9. The system of claim 8, wherein relaxing timing constraints comprises:
   removing timing constraints from the circuit design.

10. The system of claim 8, wherein relaxing the timing constraints comprises:
    removing the feed-forward paths from the circuit design.

11. The system of claim 8, wherein the processor is further programmed to initiate executable operations comprising:
    restoring the timing constraints of the feed-forward paths;
    un-placing and un-routing the feed-forward paths; and
    performing a further placement and routing of the feed-forward paths of the circuit design while leaving the second placement and routing of loop paths unchanged.

12. The system of claim 8, wherein the processor is further programmed to initiate executable operations comprising:
    inserting pipeline stages for feed-forward paths;
    un-placing and un-routing the feed-forward paths; and
    performing a further placement and routing of the feed-forward paths with the pipeline stages.

13. The system of claim 8, wherein the processor is further programmed to initiate executable operations comprising:
    estimating a number of pipelined stages to achieve the target operating frequency.

14. The system of claim 13, wherein the processor is further programmed to initiate executable operations comprising:
    inserting the pipelined stages into the feed-forward paths of the circuit design;
    un-placing and un-routing the circuit design; and
    performing a further placement and routing for the circuit design with the pipeline stages.

15. A non-transitory computer-readable storage medium having instructions stored thereon which, when executed by a processor, perform a method comprising:
    determining that an operating frequency for a first initial placement and routing for a circuit design does not exceed a target operating frequency;
    distinguishing between loop paths and feed-forward paths in the circuit design;
    responsive to determining that the operating frequency does not exceed the target operating frequency, relaxing timing constraints of the feed-forward paths;
    performing a second placement and routing on the loop paths and the feed-forward paths of the circuit design wherein loop paths are prioritized from the relaxing of the timing constraints during the second placement and routing; and
    configuring an integrated circuit with the circuit design resulting from the second placement and routing.

16. The non-transitory computer-readable storage medium of claim 15, wherein relaxing timing constraints comprises at least one of:
    removing timing constraints from the circuit design; or
    removing the feed-forward paths from the circuit design.

17. The non-transitory computer-readable storage medium of claim 15, the method further comprising:

restoring the timing constraints of the feed-forward paths;
un-placing and un-routing the feed-forward paths; and
performing a further placement and routing of the feed-forward paths of the circuit design while leaving the second placement and routing of loop paths unchanged.

18. The non-transitory computer-readable storage medium of claim 15, the method further comprising:
inserting pipeline stages for feed-forward paths;
un-placing and un-routing the feed-forward paths; and
performing a further placement and routing of the feed-forward paths with the pipeline stages.

19. The non-transitory computer-readable storage medium of claim 15, the method further comprising:
estimating a number of pipelined stages to achieve the target operating frequency.

20. The non-transitory computer-readable storage medium of claim 19, the method further comprising:
inserting the pipelined stages into the feed-forward paths of the circuit design;
un-placing and un-routing the circuit design; and
performing a further placement and routing for the circuit design with the pipeline stages.

* * * * *